Dec. 8, 1936. S. U. SIVON ET AL Re. 20,201

PHIMOSIS HEMOSTATIC FORCEPS

Original Filed March 15, 1932 2 Sheets-Sheet 1

Inventors

Stephen U. Sivon

Charles A. Sivon

By Clarence A. O'Brien

Attorney

Dec. 8, 1936. S. U. SIVON ET AL Re. 20,201

PHIMOSIS HEMOSTATIC FORCEPS

Original Filed March 15, 1932 2 Sheets-Sheet 2

Inventors

Stephen U. Sivon
Charles A. Sivon

By Clarence A. O'Brien
Attorney

UNITED STATES PATENT OFFICE 20,201

PHIMOSIS HEMOSTATIC FORCEPS

Stephen Ulysses Sivon, Ravenna, and Charles Arthur Sivon, Painesville, Ohio

Original No. 1,946,642, dated February 13, 1934, Serial No. 598,940, March 15, 1932. Application for reissue November 23, 1935, Serial No. 51,310

30 Claims. (Cl. 128—305)

Our invention relates generally to instruments for performing minor surgery, and particularly to a forceps for performing the operation known as circumcision.

It is an important object of our invention to provide a relatively inexpensive, mechanically efficient, device of the character described which enables the performance of surgically correct operations.

It is also an important object of our invention to provide an instrument of the character described which produces for the operation a hemostatic condition which remains after the performance of the operation of circumcision, so that ties and bandages are not necessary subsequent to the operation.

It is also an important object of our invention to provide an instrument of the character described with which the operation of circumcision may be performed so as to produce, as a result of the operation, hemostatic surfaces upon the severed edge of the tissue.

Another object of our invention is to provide for the severing of the foreskin of the penis along a line which is on a plane parallel to the plane running through the corona of the penis.

Another object is to provide for the severing of the foreskin without injury to the frenum or to the glans.

A still further object is to provide a device which will sever the foreskin on both sides of the penis in one operation.

Another object is the provision of an instrument which will firmly hold the entire foreskin to be cut while the said foreskin is severed.

Still another object is to provide an instrument for holding the foreskin which will permit the free circulation of blood in the glans during the operation on said foreskin.

It is also an important object of our invention to provide an instrument of the type described for performing the operation of circumcision by the use of which the operation may be performed without requiring administration to the patient of anesthetics, the operation being practically painless and capable of being very quickly performed.

Other objects and advantages of our invention will be apparent from a reading of the following description in connection with the drawings, wherein for purposes of illustration we have shown a preferred embodiment of our invention: in which, Figure 1 is a general side elevational view of the embodiment.

Figure 2:
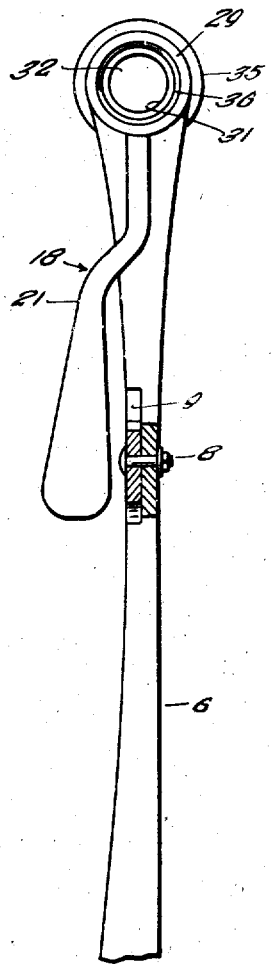
Figure 2 is a transverse vertical sectional view through Figure 1.
Figure 7:
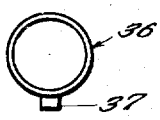
Figure 7 is an end view of the blade of the device.

Referring in detail to the drawings, the numeral 5 generally designates the device of our invention which is composed of the normally stationary lever 6 and the normally movable lever 7 which are crossed on a common pivot 8. As shown in Figure 2 the lever 6 is wider at the point where the levers cross and is provided with an opening 9 in its side in which the lever 7 seats and works on the pivot 8.

The lever 6 comprises the handle portion and the knife carrying portion 11. The lever 7 comprises the handle portion 12 and the knife accommodating portion 13.

The portion 11 of the normally stationary lever 6 has in its end a cylindrical opening 14 which faces the portion 13 of the lever 6. Extending toward the pivot 8 from the opening 14 is a narrow slot 15 which is traversed by a pivot pin 16 and a retainer pin 17. Working in the slot 15 and extending from the slot toward the portion 13 of the lever 7 is a knife operating lever 18 which has an enlarged head portion 19 which the pivot 16 traverses eccentrically so as to endow the head 19 with a cam action with respect to a knife structure which is axially movable in the opening 14 in the end of the lever in a manner to be described. A spring member 20 generally in the form of a numeral 6 having a suitable number of convolutions is arranged in the slot 15 about the pin 17 and engaged with the operating lever 18 in such a way that the lever 18 is normally positioned outwardly in the inoperative position. It will be observed that the handle portion of the lever 18 is offset to one side of the levers 6, 7 to a position convenient for operating the same while holding the levers 6 and 7 closed.

The cylindrical opening 14 in the end of the portion 11 of the lever 6 is located in a knife bearing head 22 which has an angularly arranged inward end generally designated 23, so that when the levers are brought together into the closed position the surface 23 engages the portion 13 of the lever 7 at an angle.

The end portion of the portion 13 of the lever 7 is generally circular in form providing a head 24 provided with a meeting face 25 at such an angle that when the meeting face 23 of the head 22 meets the meeting face 25 of the head 24, they will coincide and meet on all points.

Figure 4:
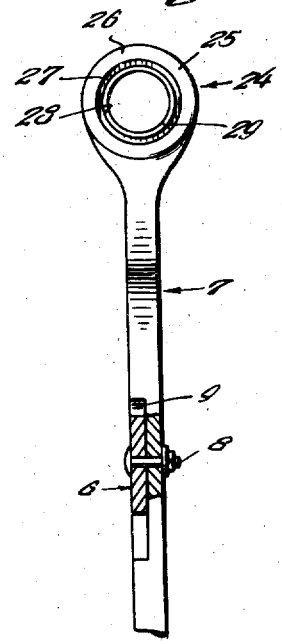
Figure 4 is a vertical transverse sectional view taken approximately on the line 4—4 of Figure 3 looking in the direction of the arrows.
Figure 5:
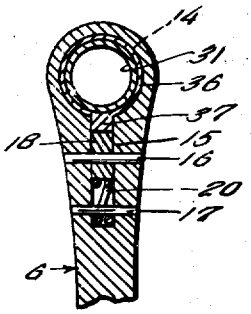
Figure 5 is a vertical transverse sectional view taken through Figure 3 approximately on the line 5—5 and looking in the direction of the arrows.

Reference to Figure 4 shows that the meeting face 25 of the head 24 of the lever 7 has thereon the annular portion 26 which is rounded in contour and sloped slightly inwardly toward its center and leads into an annular knife receiving groove 27 which is formed on an axis which coincides with the axis of the cylindrical opening 14 in the head 22 when the heads are registered. Spaced concentrically inwardly from the groove 27 is a cylindrical passage 28 through which the penis glans of the patient is extended when the levers are brought together for producing the hemostatic condition referred to herein and during the performance of the operation. The annular surface 26 is specially formed to cooperate with conformably convexed annular surface 29 on the meeting face 23 of the head 22 for producing the uniform hemostatic condition of the skin and tissues which are to be placed between the meeting surfaces at the outset of the operation of circumcision and which are to be crushed by the bringing together of the meeting faces whereby the required hemostatic condition is produced and localized.

Figure 3:
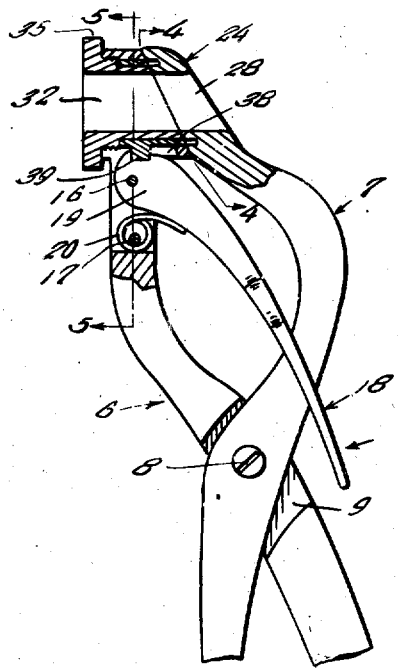
Figure 3 is a vertical sectional view taken through Figure 1 at right angles to the view shown in Figure 2, showing the embodiment in closed position.
Figure 6:
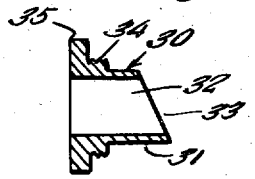
Figure 6 is a transverse sectional view through a tubular member.

The tubular guide generally designated 30 which is shown in section in Figure 6 and in Figure 3 has a tubular portion 31 having an axial opening 32 of the same size as the opening 28 in the head 24 on the lever 7, and its meeting end is cut off at an angle as indicated at 33 similar to the angle of the meeting face 25 of the head 24. The cross section of the tubular portion 31 is exactly the same as that of the annular portion 29 as defined by the opening 28 and the groove 27 in the head 24, so that when the heads 22, 24 are brought together the end of the tubular portion 31 of the guide 30 and the portion 29 will register and engage at all points.

Figure 1:
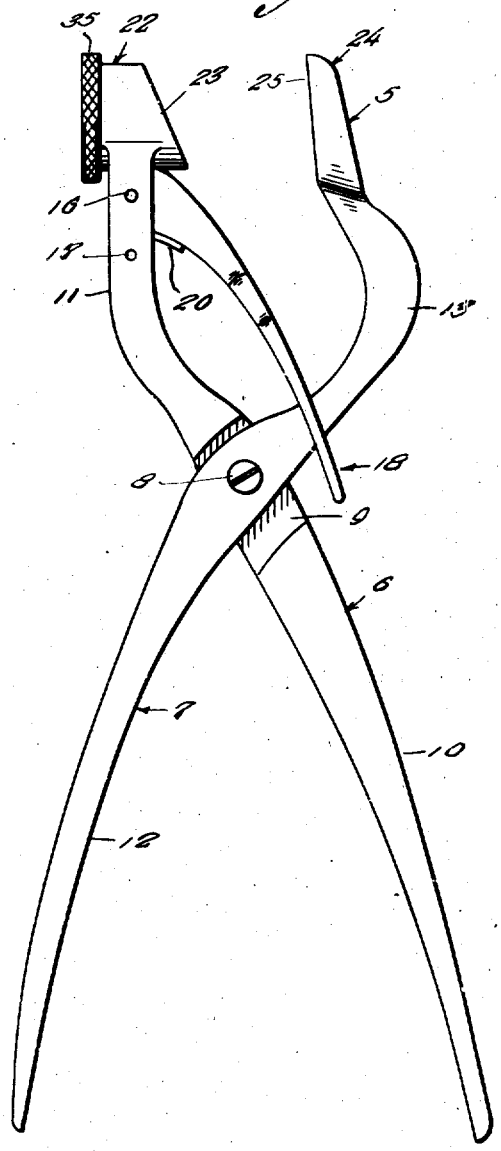

Outward of the tubular portion 31 is a portion of larger diameter 34 which is exteriorly screw-threaded for threading into the outer end of the head 22, and outward of the portion 34 is the portion of still larger diameter 35 which may be suitably knurled as shown in Figure 1 to enable easily manipulating the same into and out of threaded engagement with the head 22.

Slidable in the annular chamber defined by the resulting space between the opening 14 in the head 22 and the outside of the tubular portion 31 of the guide 30, is the cylindrical knife generally designated 36 whose working end has a peripheral edge, and disposed such that the plane running through said edge is at an angle similar to the angle at which the meeting face 23 is disposed, the other end being square cut for seating against the shoulder defined by the tubular portion 31 and the threaded portion of greater diameter 34 on the guide 30. Projecting from one side of the cylindrical blade 36 is a boss 37 which works in a slot 38 provided in the side of the head 22 and which communicates with the slot 15 in the portion 11 of the lever 6. A portion of the enlarged head 18 of the operating lever 18 removed from the pivotal center of the lever is formed with a notch 39 for receiving the boss 37 in the manner shown in Figure 3. It will be obvious that when the lever 18 is moved in the direction of the arrows shown in Figure 3 that the cylindrical blade 36 will be moved toward the right. In the position of the lever shown in Figure 3 the cutting end of the blade will then enter the annular groove 27 in the meeting face of the head 24 of the lever 7, and upon release of the lever 18 the spring 20 will return the blade to initial position. The blade is shown in its initial position in Figure 3.

The axial opening 32 through the guide 30 in the stationary lever is registered with the opening 28 in the head 24 of the movable lever when the levers are closed, so that a continuous regular passage is provided for receiving the penis of the patient during the operation.

The operation is initiated by placing the prepared organ through the opening 32 in the lever 6, then arranging the prepared tissues and flesh properly upon the concave annular surface 29. Then lever 7 is swung so that its head 24 approaches the organ and receives the same through the opening 28, and the said tissues and flesh are then engaged on their other side by the convex annular surface 26 of the lever 7, whereupon pressure is exerted upon the levers to crush and hold the imprisoned portions of the tissues and flesh so as to produce the hemostatic condition spoken of. When this condition has been achieved, the operating lever 18 is pressed so as to project the knife 36 into the annular groove 27 which accomplishes the necessary cutting of and severance of the foreskin and tissues of the penis of the patient at an angle to the frenum and along a line having a plane parallel to the plane passing through the corona of the penis.

More specific directions for utilizing the device of the invention are as follows:—

The foreskin of the organ is grasped with a hemostat and dilated, and then cut, longitudinally of the penis and on the side opposite the frenum, with scissors to the point of circumcision. With the hemostat the foreskin and the organ are pulled through the opening 32 of the device of our invention, the levers being opened as far as possible. Then the foreskin is grasped with preferably four hemostats equally spaced or divided, and the foreskin stretched so that the area of circumcision is placed accurately over the circular knife 36 and the concave annular portion 29. Then, the lever 7 is swung toward the lever 6 so as to register the convex annular portion 26 with the concave annular portion 29, with the foreskin interposed, and the levers are forcibly closed for a few minutes, preferably three to five minutes, until hemostasis has resulted. While forcibly closing the levers the knife operating lever 18 is moved, thereby causing the blade 36 to sever the foreskin. The levers are kept tightly pressed together for a few minutes thereafter so as to insure complete hemostasis of the severed tissues remaining on the penis.

Then the hemostats are removed, the severed foreskin allowed to fall away, and the device of the invention removed from the penis of the patient.

Though we have shown and described herein a preferred embodiment of our invention, it is to be definitely understood that we do not desire to limit the application of the invention thereto, and any change or changes may be made in material and structure and arrangement of parts, within the spirit of the invention and the scope of the subjoined claims.

We claim as our invention:

1. An instrument of the type described for holding and cutting the foreskin of a penis comprising, a pair of pivoted levers, cooperating heads on said levers adapted to be registered and further adapted to hold said foreskin placed between the said heads, said heads having open spaces for accommodating said penis, a knife mounted in cooperative relationship with one of said heads, the other of said heads having an opening for receiving a portion of said knife, and means for moving said knife relative to said opening to cut the said foreskin between the said heads.

2. An instrument of the type described comprising a pair of crossed levers, cooperating heads on said levers adapted to be registered, a knife on one of the heads, and a knife receiving opening provided in the other head, and penis receiving openings in said heads, said knife being movable, and knife operating lever means for moving the knife for severing a penis foreskin interposed and held between said heads.

3. A surgical instrument of the type described comprising a pair of crossed levers, a cooperating head on one end of each of the levers adapted to be registered when the levers are closed, said heads being provided with axially registered openings adapted to be registered when the heads are in cooperating relation, said openings being adapted to receive a penis when registered, portions on said heads for cooperation in holding portions of the foreskin of the penis for producing a localized hemostatic condition therein when the levers are forcibly closed, knife means on one of the heads for severing the foreskin, operating lever means for operating the knife carried by said lever head for operating the knife during the production of the hemostatic condition.

4. A surgical instrument of the type described comprising a pair of pivotally connected levers, cooperating heads on the levers provided with penis receiving openings arranged to register when the levers are closed, a tubular knife on one of the heads and a knife receiving opening provided in the other head.

5. A surgical instrument of the type described comprising a pair of pivotally connected levers, cooperating heads on the levers provided with penis receiving openings arranged to register when the levers are closed, a tubular knife on one of the heads and a knife receiving opening provided in the other head, said tubular knife and the knife receiving opening surrounding the penis receiving openings in the heads.

6. In a surgical instrument including a pair of pivotally connected levers, cooperating heads on the levers having penis receiving openings arranged to register when the levers are closed; penis foreskin hemostasis producing formations on the meeting portions of the heads, and knife means carried by one head and cooperable with the remaining head for severing the foreskin of the penis when hemostasis thereof has been accomplished.

7. In a surgical instrument including a pair of pivotally connected levers, cooperating heads on the levers having penis receiving openings arranged to register when the levers are closed; penis foreskin hemostasis producing formations on the meeting portions of the heads, and knife means carried by one head and cooperable with the remaining head for severing the foreskin of the penis when hemostasis thereof has been accomplished, said knife means being of tubular form and movable into an annular opening provided on the remaining head.

8. A surgical instrument of the type described comprising a pair of pivotally connected levers, cooperating heads on the levers provided with penis receiving openings arranged to register when the levers are closed, a tubular knife on one of the heads and a knife receiving opening provided in the other head, said tubular knife and the knife receiving opening surrounding the penis receiving openings in the heads, said tubular knife and said knife receiving openings being radially outwardly spaced from the penis receiving openings.

9. In a surgical instrument including a pair of pivotally connected levers, cooperating heads on the levers having penis receiving openings arranged to register when the levers are closed; penis foreskin hemostasis producing formations on the meeting portions of the heads, and knife means carried by one head and cooperable with the remaining head for severing the foreskin of the penis when hemostasis thereof has been accomplished, said hemostasis producing formations and the working end of the knife being disposed at an angle to the axis of the penis receiving openings to produce circular and angular amputation of the penis foreskin.

10. A circumcising instrument comprising, in combination, engaging means having a penis receiving portion, a second engaging means having a penis receiving portion, means for cooperatively moving the engaging means relative to each other, the arrangement of the said engaging means being such that the penis may be inserted through the penis receiving portion of the first engaging means and such that the foreskin may be engaged between the two engaging means while the forward end of the penis extends into the penis receiving portion of the second engaging means, and means slidably mounted on one of the engaging means for cutting the foreskin.

11. A circumcising instrument comprising, in combination, engaging means having a penis receiving portion, a second engaging means having a penis receiving portion, lever means for cooperatively moving the engaging means relative to each other, the arrangement of the said engaging means being such that the penis may be inserted through the penis receiving portion of the first engaging means and such that the foreskin may be engaged between the two engaging means to produce a hemostatic condition while the forward end of the penis extends into the penis receiving portion of the second engaging means, and means slidably mounted on one of the engaging means for cutting the foreskin.

12. A surgical instrument for use in hemostatically severing the foreskin of the penis, comprising, in combination, a member having a penis receiving opening and having a portion adapted to engage said foreskin, a member adapted to engage said foreskin, and means connecting said members for moving one of said members longitudinally of said penis toward the other said member for exerting an axially directed pressure upon said foreskin, thereby causing hemostasis as said foreskin is severed.

13. A surgical instrument for use in hemostatically severing the foreskin of the penis, comprising, in combination, a first member having a portion adapted to receive the head of the penis, and also having a portion adapted to engage one side of the foreskin of said penis, a second member adapted to engage the other side of the foreskin between the two said members, and means connecting said members for forcing in a direction longitudinal of said penis, the two members together so as to tightly clamp the foreskin and cause hemostasis during the severing of the foreskin.

14. A device adapted for the removal of the foreskin of the penis, comprising, in combination, hemostatic means for controlling the flow of blood in the foreskin, said hemostatic means adapted to substantially encircle the said penis, and associated cutting means slidably mounted on the said hemostatic means for severing the foreskin.

15. A device for circumcising the foreskin of the penis and for the control of the blood flow caused by the circumcision, comprising, in combination, hemostatic means adapted to accommodate said penis and to clasp said foreskin for applying pressure upon the foreskin, said hemostatic means being adapted to apply said pressure upon all parts of the foreskin to be cut in said circumcision in a direction longitudinal of said penis, associated cutting means carried by said hemostatic means for severing the foreskin to which said pressure is applied, and means for operating said hemostatic means and said cutting means.

16. A surgical instrument for hemostatically removing the foreskin of the penis, comprising, in combination, lever means for applying pressure upon all parts of the foreskin to be cut in said circumcision, said lever means being adapted to be moved longitudinally of said penis and to engage said foreskin laterally of said penis, and cutting means carried by said lever means for severing said foreskin under said pressure from said penis, and means for operating said lever means and said cutting means.

17. A surgical instrument for hemostatically removing the foreskin of the penis, comprising, in combination, a pair of pivoted levers having portions adapted to be disposed in an arc about said penis and to apply pressure to said foreskin, one of said portions having an opening adapted to accommodate, and to receive part of, said penis, cutting means mounted on one of said levers, means for moving said cutting means intermediate said levers from one of said levers toward the other of said levers, said cutting means being adapted to cut the foreskin while under the pressure of the said portions of the levers.

18. A surgical instrument for hemostatically severing the foreskin of the penis, comprising, in combination, a pair of pivotally connected levers, cooperating members mounted on said levers, one of said members having a penis receiving opening, cutting means mounted upon one of said members, the other of said members having a recess adapted to register with said cutting means, and operating means for operating said cutting means, the combination of the members and the cutting means being such that the foreskin of the penis is clamped between said members and severed by said cutting means.

19. A surgical instrument for hemostatically severing the foreskin of the penis comprising, in combination, a pair of cooperating members for clamping said foreskin, one of said members having a portion adapted to embrace said penis, means for moving said members relative to each other so as to hemostatically clamp said foreskin, cutting means carried by one of said members for severing said foreskin, and operating means for operating said cutting means.

20. A surgical instrument for hemostatically severing the foreskin of the penis along a line which is on a plane substantially parallel to the plane passing through the corona of the said penis comprising, in combination, a pair of cooperating members for clamping said foreskin, one of said members having a portion adapted to embrace said penis, said portion adapted to be disposed axially of said penis, foreskin engaging portions on said members, said engaging portions being disposed on a plane which is substantially parallel to said plane passing through the corona, means for moving said members relative to each other so as to hemostatically clamp said foreskin, cutting means carried by one of said members for severing the said foreskin along said line, and operating means for operating said cutting means.

21. A surgical instrument for severing the foreskin of the penis comprising, in combination, a pair of members adapted to engage the said foreskin between the said members, one of said members having a portion adapted to embrace said penis, cutting means carried by one of said members and extending toward the other of said members, and operating means for moving said cutting means relative to said other member so as to sever the foreskin between said members.

22. A surgical instrument for hemostatically severing the foreskin of the penis along a line which is substantially on a plane passing through the penis and disposed at an acute angle to the frenal cord of said penis so that said foreskin is severed without injury to the said frenal cord comprising, in combination, a pair of cooperative members, each of said members having a portion adapted to accommodate said penis, one of said portions being adapted to substantially embrace said penis, said portions adapted to be disposed axially of said penis, a foreskin engaging portion on each of said members, said engaging portions being disposed substantially parallel to said plane, means for clamping said members together so as to hemostatically clamp the said foreskin between said members, cutting means carried by one of said members, and means for operating said cutting means so as to sever the said foreskin clamped between the said members.

23. A circumcising instrument for hemostatically severing the foreskin of the penis, said foreskin having an inner and an outer layer of skin, comprising, in combination, a pair of members having foreskin engaging surfaces, one of said surfaces being adapted to engage the inner layer of skin of said foreskin and the other of said surfaces being adapted to engage the outer layer of skin of said foreskin, one of said members having a portion for embracing said penis, said portion adapted to be disposed axially of the penis, the said surfaces of said members being disposed at an inclined angle to said axially disposed portion, means for clamping said members together so as to cause hemostasis in the foreskin, and cutting means carried by one of said members for severing the said foreskin clamped between said members.

24. A circumcising instrument for hemostatically severing the foreskin of the penis comprising, in combination, a first member having a cylindrical opening for accommodating said penis and having a foreskin engaging surface, a second member having a foreskin engaging surface adapted to register with the surface of the first member, said registered surfaces being disposed on an inclined angle to the axis of said cylindrical opening, means for operating said members so as to press the foreskin between the said members, cutting means carried by one of said members for cutting said foreskin, and operating means for operating said cutting means.

25. A device for hemostatically severing the foreskin of the penis comprising, in combination, a pair of members having foreskin engaging surfaces disposed radially of said penis, means for moving said members so as to exert pressure axially of said penis upon the said foreskin causing hemostasis of the said foreskin, cutting means supported by one of said members for severing the said foreskin, and operating means for operating said cutting means.

26. In a penis foreskin circumcising device having a pair of clamping members adapted to embrace said penis for clamping the foreskin interposed between the said clamping members and having operating means, of a blade having a tubular portion adapted to be carried by one of said clamping members, a cutting edge portion adapted to extend toward the other of said clamping members and to sever the foreskin interposed between said clamping members, and an engaging portion adapted to engage said operating means.

27. In a penis foreskin circumcising device, said device having a pair of clamping members for clamping said foreskin, one of the clamping members being adapted to embrace said penis, and having operating means, of a blade member having an arcuate body portion adapted to be slidably carried by one of said clamping members, a cutting edge portion extending from said body portion and adapted to sever the foreskin interposed between said clamping members, and an engaging portion adapted to engage said operating means.

28. In a penis foreskin circumcising device, said device having a pair of clamping members for clamping said foreskin along a plane which is substantially parallel to a plane passing through the corona of said penis, one of the clamping members being adapted to substantially embrace said penis, and having operating means, of a blade member having an arcuate body portion adapted to be carried by one of said clamping members and to be moved relative to said clamping member, a cutting portion projecting from said body portion and adapted to extend from said body portion substantially parallel to said penis, the said cutting portion being arranged to sever the foreskin interposed between said clamping members along a line which lies on said first mentioned plane, and an engaging portion adapted to engage said operating means.

29. In a penis foreskin circumcising device, said device having hemostatic means and cutting operating means, of a cutting member adapted to be carried by said hemostatic means, said cutting member being adapted to be disposed substantially circumferentially of said penis, the said cutting member having a cutting portion adapted to sever the foreskin in said hemostatic means and having an engaging portion adapted to engage said operating means.

30. In a penis foreskin circumcising device, said device having hemostatic means, of a cutting member adapted to be carried by said hemostatic means, said cutting member being adapted to be disposed in an arc about said penis and being adapted to extend substantially axially of the said penis, the said cutting member being adapted to sever the foreskin of said penis.

STEPHEN ULYSSES SIVON.
CHARLES ARTHUR SIVON.